(12) United States Patent
Kim et al.

(10) Patent No.: US 8,831,042 B2
(45) Date of Patent: Sep. 9, 2014

(54) METHOD OF TRANSMITTING SOUNDING REFERENCE SIGNAL IN WIRELESS COMMUNICATION SYSTEM

(75) Inventors: Hak Seong Kim, Anyang-si (KR); Bong Hoe Kim, Anyang-si (KR); Young Woo Yun, Anyang-si (KR); Ki Jun Kim, Anyang-si (KR); Dong Wook Roh, Anyang-si (KR); Dae Won Lee, Anyang-si (KR); Suk Hyon Yoon, Anyang-si (KR); Joon Kui Ahn, Anyang-si (KR); Dong Youn Seo, Anyang-si (KR)

(73) Assignee: LG Electronics Inc., Seoul (KR)

( * ) Notice: Subject to any disclaimer, the term of this patent is extended or adjusted under 35 U.S.C. 154(b) by 503 days.

(21) Appl. No.: 12/532,944

(22) PCT Filed: Mar. 28, 2008

(86) PCT No.: PCT/KR2008/001771
§ 371 (c)(1),
(2), (4) Date: Sep. 24, 2009

(87) PCT Pub. No.: WO2008/120925
PCT Pub. Date: Oct. 9, 2008

(65) Prior Publication Data
US 2010/0135273 A1    Jun. 3, 2010

Related U.S. Application Data

(60) Provisional application No. 60/908,939, filed on Mar. 29, 2007, provisional application No. 60/944,802, (Continued)

(30) Foreign Application Priority Data

Jun. 12, 2007   (KR) .................... 10-2007-0057465
Mar. 28, 2008   (KR) .................... 10-2008-0029222

(51) Int. Cl.
*H04B 3/10*      (2006.01)
*H04L 1/16*      (2006.01)
(Continued)

(52) U.S. Cl.
CPC ............ *H04L 1/1692* (2013.01); *H04L 5/0048* (2013.01); *H04L 1/0072* (2013.01); *H04L 1/0033* (2013.01); *H04L 5/0053* (2013.01); *H04L 1/0068* (2013.01); *H04L 5/0007* (2013.01); *H04B 1/69* (2013.01); *H04J 13/18* (2013.01)
USPC .......................................... 370/491; 370/344

(58) Field of Classification Search
USPC ................................................. 370/344, 491
See application file for complete search history.

(56) References Cited

U.S. PATENT DOCUMENTS 6,031,831 A  *  2/2000  Tan Boon et al. ............. 370/342
(Continued)

FOREIGN PATENT DOCUMENTS

CN           1797986           7/2006
(Continued)

OTHER PUBLICATIONS

Samsung, "UL Reference Signal Multiplexing", 3GPP TSG RAN WG1 Meeting #47, R1-063257, Nov. 2006, pp. 1-4.*
(Continued)

*Primary Examiner* — Brandon Renner
*Assistant Examiner* — Scott M Sciacca
(74) *Attorney, Agent, or Firm* — Lee, Hong, Degerman, Kang & Waimey

(57) ABSTRACT

A method of transmitting a sounding reference signal includes generating a physical uplink control channel (PUCCH) carrying uplink control information on a subframe, the subframe comprising a plurality of SC-FDMA (single carrier-frequency division multiple access) symbols, wherein the uplink control information is punctured on one SC-FDMA symbol in the subframe, and transmitting simultaneously the uplink control information on the PUCCH and a sounding reference signal on the punctured SC-FDMA symbol. The uplink control information and the sounding reference signal can be simultaneously transmitted without affecting a single carrier characteristic.

10 Claims, 15 Drawing Sheets

Related U.S. Application Data filed on Jun. 19, 2007, provisional application No. 60/955,863, filed on Aug. 14, 2007, provisional application No. 60/956,382, filed on Aug. 16, 2007, provisional application No. 60/970,535, filed on Sep. 7, 2007, provisional application No. 60/983,216, filed on Oct. 28, 2007, provisional application No. 60/989,417, filed on Nov. 20, 2007.

(51) Int. Cl.
  *H04L 5/00* (2006.01)
  *H04L 1/00* (2006.01)
  *H04B 1/69* (2011.01)
  *H04J 13/18* (2011.01)

(56) References Cited

U.S. PATENT DOCUMENTS

| | | | |
|---|---|---|---|
| 6,359,923 B1 | 3/2002 | Agee et al. | |
| 6,480,522 B1 | 11/2002 | Hoole et al. | |
| 6,621,851 B1 | 9/2003 | Agee et al. | |
| 6,628,956 B2* | 9/2003 | Bark et al. | 455/522 |
| 6,804,307 B1 | 10/2004 | Popovic | |
| 6,873,606 B2 | 3/2005 | Agrawal et al. | |
| 7,106,781 B2 | 9/2006 | Agee et al. | |
| 7,149,238 B2 | 12/2006 | Agee et al. | |
| 7,430,244 B2 | 9/2008 | Chung et al. | |
| 7,433,347 B1 | 10/2008 | Trott et al. | |
| 7,469,015 B2 | 12/2008 | Le Nir et al. | |
| 7,577,085 B1 | 8/2009 | Narasimhan | |
| 7,623,441 B1 | 11/2009 | Sampath et al. | |
| 7,675,886 B2 | 3/2010 | Agrawal et al. | |
| 7,720,168 B2 | 5/2010 | Su et al. | |
| 7,724,639 B1 | 5/2010 | Porat et al. | |
| 7,724,838 B2 | 5/2010 | Mantravadi | |
| 7,773,685 B2 | 8/2010 | Tirkkonen et al. | |
| 7,778,151 B2* | 8/2010 | Bertrand et al. | 370/208 |
| 7,852,806 B2 | 12/2010 | Ahn et al. | |
| 7,869,402 B2 | 1/2011 | Yoon et al. | |
| 7,881,222 B2 | 2/2011 | Lee et al. | |
| 7,889,633 B2 | 2/2011 | Noh et al. | |
| 7,894,330 B2 | 2/2011 | Lee et al. | |
| 7,920,638 B2 | 4/2011 | Le Nir et al. | |
| 7,929,563 B2 | 4/2011 | Wang et al. | |
| 7,991,063 B2 | 8/2011 | Khan et al. | |
| 8,014,769 B2 | 9/2011 | Lee et al. | |
| 8,019,332 B2 | 9/2011 | Lee et al. | |
| 8,027,297 B2 | 9/2011 | Kim et al. | |
| 8,031,583 B2 | 10/2011 | Classon et al. | |
| 8,031,668 B2 | 10/2011 | Wang et al. | |
| 8,036,197 B2 | 10/2011 | Pajukoski et al. | |
| 8,041,362 B2 | 10/2011 | Li et al. | |
| 8,050,227 B2 | 11/2011 | Lee et al. | |
| 8,116,271 B2 | 2/2012 | Pi | |
| 8,155,069 B2 | 4/2012 | Chun et al. | |
| 8,194,579 B2 | 6/2012 | Lee et al. | |
| 8,351,392 B2 | 1/2013 | Ahn et al. | |
| 8,498,254 B2 | 7/2013 | Dai et al. | |
| 8,625,509 B2 | 1/2014 | Ahn et al. | |
| 8,631,298 B2 | 1/2014 | Lee et al. | |
| 2003/0067907 A1 | 4/2003 | Rezaiifar et al. | |
| 2003/0083069 A1 | 5/2003 | Vadgama | |
| 2003/0185159 A1* | 10/2003 | Seo et al. | 370/278 |
| 2004/0058687 A1* | 3/2004 | Kim et al. | 455/452.2 |
| 2004/0133841 A1* | 7/2004 | Lundby et al. | 714/790 |
| 2004/0257978 A1 | 12/2004 | Shao et al. | |
| 2005/0052991 A1 | 3/2005 | Kadous | |
| 2005/0063378 A1 | 3/2005 | Kadous | |
| 2005/0068918 A1 | 3/2005 | Mantravadi et al. | |
| 2005/0068931 A1* | 3/2005 | Cho et al. | 370/345 |
| 2005/0157680 A1 | 7/2005 | Zhang et al. | |
| 2005/0180328 A1 | 8/2005 | Kim et al. | |
| 2005/0186981 A1* | 8/2005 | Nishio | 455/522 |
| 2005/0250540 A1 | 11/2005 | Ishii et al. | |
| 2005/0265250 A1 | 12/2005 | Gollamudi et al. | |
| 2005/0268202 A1 | 12/2005 | Molisch et al. | |
| 2006/0018259 A1 | 1/2006 | Kadous | |
| 2006/0023745 A1 | 2/2006 | Koo et al. | |
| 2006/0034240 A1 | 2/2006 | Kwak et al. | |
| 2006/0034383 A1 | 2/2006 | Su et al. | |
| 2006/0035643 A1* | 2/2006 | Vook et al. | 455/450 |
| 2006/0045010 A1 | 3/2006 | Baker et al. | |
| 2006/0067413 A1 | 3/2006 | Tsai | |
| 2006/0128410 A1 | 6/2006 | Derryberry et al. | |
| 2006/0146867 A1* | 7/2006 | Lee et al. | 370/465 |
| 2006/0171342 A1* | 8/2006 | Dateki | 370/311 |
| 2006/0193373 A1 | 8/2006 | Agee et al. | |
| 2007/0011550 A1 | 1/2007 | Agrawal et al. | |
| 2007/0040703 A1 | 2/2007 | Akkarakaran et al. | |
| 2007/0070944 A1* | 3/2007 | Rinne et al. | 370/329 |
| 2007/0140178 A1 | 6/2007 | Jung et al. | |
| 2007/0165739 A1 | 7/2007 | Hottinen et al. | |
| 2007/0171849 A1 | 7/2007 | Zhang et al. | |
| 2007/0183380 A1 | 8/2007 | Rensburg et al. | |
| 2007/0183384 A1 | 8/2007 | Kwak et al. | |
| 2007/0211656 A1* | 9/2007 | Kwak et al. | 370/319 |
| 2007/0223618 A1 | 9/2007 | Jeong et al. | |
| 2007/0253465 A1 | 11/2007 | Muharemovic et al. | |
| 2007/0286261 A1* | 12/2007 | Molev-Shteiman | 375/148 |
| 2008/0013610 A1 | 1/2008 | Varadarajan et al. | |
| 2008/0019307 A1 | 1/2008 | Tenny et al. | |
| 2008/0032630 A1* | 2/2008 | Kim et al. | 455/45 |
| 2008/0037464 A1 | 2/2008 | Lim et al. | |
| 2008/0043867 A1 | 2/2008 | Blanz et al. | |
| 2008/0043874 A1 | 2/2008 | Lee et al. | |
| 2008/0080634 A1 | 4/2008 | Kotecha et al. | |
| 2008/0101211 A1 | 5/2008 | Rao | |
| 2008/0151831 A1 | 6/2008 | Khan et al. | |
| 2008/0159323 A1 | 7/2008 | Rinne et al. | |
| 2008/0182582 A1* | 7/2008 | Bachl et al. | 455/446 |
| 2008/0219219 A1 | 9/2008 | Sartori et al. | |
| 2008/0232234 A1* | 9/2008 | McCoy et al. | 370/203 |
| 2008/0232300 A1* | 9/2008 | McCoy et al. | 370/328 |
| 2008/0232395 A1* | 9/2008 | Buckley et al. | 370/465 |
| 2008/0233964 A1 | 9/2008 | McCoy et al. | |
| 2008/0267310 A1 | 10/2008 | Khan et al. | |
| 2008/0287155 A1 | 11/2008 | Xu et al. | |
| 2008/0304467 A1 | 12/2008 | Papasakellariou et al. | |
| 2008/0304593 A1 | 12/2008 | Khan et al. | |
| 2008/0310540 A1 | 12/2008 | Tiirola et al. | |
| 2009/0011700 A1* | 1/2009 | Nishio et al. | 455/7 |
| 2009/0046672 A1 | 2/2009 | Malladi et al. | |
| 2009/0046774 A1 | 2/2009 | Abou Rjeily | |
| 2009/0046789 A1 | 2/2009 | Xu et al. | |
| 2009/0055703 A1 | 2/2009 | Kim et al. | |
| 2009/0073922 A1 | 3/2009 | Malladi et al. | |
| 2009/0097447 A1 | 4/2009 | Han et al. | |
| 2009/0109906 A1 | 4/2009 | Love et al. | |
| 2009/0168922 A1 | 7/2009 | Malladi et al. | |
| 2009/0175233 A1 | 7/2009 | Ojala et al. | |
| 2009/0196240 A1 | 8/2009 | Frederiksen et al. | |
| 2009/0201863 A1 | 8/2009 | Pi | |
| 2009/0201904 A1 | 8/2009 | Lee et al. | |
| 2009/0238131 A1 | 9/2009 | Montojo et al. | |
| 2009/0245187 A1 | 10/2009 | Nam et al. | |
| 2009/0259909 A1 | 10/2009 | Luo | |
| 2009/0274037 A1 | 11/2009 | Lee et al. | |
| 2009/0290597 A1 | 11/2009 | Baumgartner et al. | |
| 2009/0303866 A1 | 12/2009 | Li et al. | |
| 2009/0316811 A1* | 12/2009 | Maeda et al. | 375/260 |
| 2010/0118800 A1 | 5/2010 | Kim et al. | |
| 2010/0220708 A1 | 9/2010 | Mantravadi et al. | |
| 2011/0142097 A1 | 6/2011 | Walton et al. | |
| 2011/0176502 A1 | 7/2011 | Chung et al. | |
| 2011/0195719 A1 | 8/2011 | Chmiel et al. | |
| 2011/0292900 A1 | 12/2011 | Ahn et al. | |
| 2012/0033650 A1 | 2/2012 | Ahn et al. | |
| 2012/0087363 A1 | 4/2012 | Jongren et al. | |
| 2012/0287901 A1 | 11/2012 | Ahn et al. | |
| 2013/0039292 A1 | 2/2013 | Liu et al. | |
| 2013/0070702 A1 | 3/2013 | Ko et al. | |

(56) References Cited

U.S. PATENT DOCUMENTS

| | | | |
|---|---|---|---|
| 2013/0083750 A1 | 4/2013 | Nazar et al. | |
| 2013/0235812 A1 | 9/2013 | Heo et al. | |

FOREIGN PATENT DOCUMENTS

| | | |
|---|---|---|
| CN | 101013917 | 8/2007 |
| EP | 1175022 | 1/2002 |
| EP | 1349292 | 10/2003 |
| EP | 1389848 | 2/2004 |
| EP | 1720310 | 11/2006 |
| EP | 1746855 | 1/2007 |
| EP | 1784036 | 5/2007 |
| EP | 1819088 | 8/2007 |
| JP | 2001238269 | 8/2001 |
| JP | 2005522911 | 7/2005 |
| JP | 2007-028569 | 2/2007 |
| JP | 2007214021 | 8/2007 |
| KR | 10-2002-0009079 | 2/2002 |
| KR | 2002-009079 | 2/2002 |
| KR | 1020050057926 | 6/2005 |
| KR | 2006-0092055 | 8/2006 |
| KR | 1020070073608 | 7/2007 |
| WO | 0176110 | 10/2001 |
| WO | 2004-051872 | 6/2004 |
| WO | 2004049613 | 6/2004 |
| WO | 2005015801 | 2/2005 |
| WO | 2005-074312 | 8/2005 |
| WO | 2005/099103 | 10/2005 |
| WO | 2005-114888 | 12/2005 |
| WO | 2005/114888 | 12/2005 |
| WO | 2006/020339 | 2/2006 |
| WO | 2006028204 | 3/2006 |
| WO | 2006/099103 | 9/2006 |
| WO | 2006-107835 | 10/2006 |
| WO | 2006107835 | 10/2006 |
| WO | 2006/129749 | 12/2006 |
| WO | 2006-130742 | 12/2006 |
| WO | 2006/138337 | 12/2006 |
| WO | 2006130742 | 12/2006 |
| WO | 2007/015305 | 2/2007 |
| WO | 2007-066936 | 6/2007 |
| WO | 2007/092258 | 8/2007 |

OTHER PUBLICATIONS

Nokia, "Data-non-associated Control Signal Transmission with UL Data," 3GPP TSG RAN WG1 Meeting #48, R1-071000, Feb. 2007, XP-002573203.
LTE Rapporteur (NTT DoCoMo), "Text Proposal for TS 36.300 (Stage 2 TS)," 3GPP TSG RAN WG1 Meeting #48, R1-071251, Feb. 2007, XP-050105206.
3rd Generation Partnership Project (3GPP); "Technical Specification Group Radio Access Network; LTE Physical Layer—General Description (Release 8)," 3GPP TS 36.201 v0.11, R1-071252, Mar. 2007, XP-050105207.
Lee, H., et al., "Novel Multi-User MIMO Scheme Based on Successive Interference Cancellation", IEEE Int'l Symposium on Consumer Electronics, XP-031160370, Jun. 20, 2007.
LG Electronics Inc., "Allocation of UL ACK/NACK Index", 3GPP TSG RAN WG1#49, R1-072348, XP-050106077, May 7, 2007.
LG Electronics Inc., "PHICH Duration and Signaling", 3GPP TSG RAN WG1 #50, R1-073476, XP-050107084, Aug. 20, 2007.
Motorola, "PHICH Resource Signaling for TDD & FDD", 3GPP TSG RAN WG1 #51bis, R1-080433, XP-050108952, Jan. 14, 2007.
Motorola, "PHICH Resource Signaling for TDD & FDD", 3GPP TSG RAN WG1 #52bis, R1-081286, XP-050109724, Apr. 1, 2008.
Ericsson, "E-mail Summary Taking you Forward on Downlink Control Signaling", 3GPP TSG RAN WG1 #50bis, R1-074369, XP-050107884, Oct. 8, 2007.
Catt, et al., "Indication of PHICH Resource for TDD", 3GPP TSG RAN WG1 Meeting #52bis, R1-081326, XP-050109752, Mar. 31, 2008.

"LS on physical channel definition," R1-073231, 3GPP TSG RAN WG1 Meeting #49bis, Jun. 2007.
Panasonic, "CQI Feedback Control and Content in E-UTRA," R1-072077, 3GPP TSG-RAN WG1 Meeting #49, May 2007, XP-050105831.
Samsung, "Data and Control Channel Multiplexing in SC-FDMA for EUTRA Uplink," R1-051343, 3GPP TSG RAN WG1 #43, Nov. 2005, XP-002450962.
3rd Generation Partnership Project (3GPP), "Physical Layer Aspects for Evolved UTRA (Release 7)," 3GPP TR 25.814 v1.0.1, Dec. 2005, XP-002436402.
NTT DoCoMo Inc. et al., "Multiplexing Method of Shared Control Channel in Uplink Single-Carrier FDMA Radio Access," R1-051143, 3GPP TSG RAN WG1 #42bis, Oct. 2005, XP-002450609.
InterDigital Communications Corporation, "Uplink MIMO SC-FDMA Scheme for E-UTRA," R1-051368, 3GPP TSG RAN WG1 #43, Nov. 2005, XP-002439856.
3rd Generation Partnership Project (3GPP), "Technical Specification Group Radio Access Network; LTE Physical Layer—General Description (Release 8)," 3GPP TS 36.201, V0.3.1, R1-071252, Mar. 2007, XP-050105207.
Motorola, "Search Space Definition for L1/L2 Control Channels," R1-072691, 3GPP TSG RAN1 #49bis, Jun. 2007.
Mitsubishi Electric, "UE and CCE specific scrambling codes for low complexity blind detection of downlink control signaling," R1-072063, 3GPP TSG RAN WG1 #49 Meeting, May 2007.
Samsung, "UL Reference Signal Multiplexing", 3GPP TSG RAN WG1 Meeting #47, R1-063257, Nov. 2006.
"3rd Generation Partnership Project; Technical Specification Group Radio Access Network; Evolved Universal Terrestrial Radio Access (E-UTRA); Radio Resource Control (RRC); Protocol specification (Release 10)", 3GPP TS 36.331 V10.2.0, Jun. 2011.
"3rd Generation Partnership Project; Technical Specification Group Radio Access Network; Evolved Universal Terrestrial Radio Access (E-UTRA) Radio Resource Control (RRC); Protocol specification (Release 8)", 3GPP TS 36.331 V8.0.0, Dec. 2007.
Nokia, "Data-non-associated control signal transmission with UL data", R1-071000, 3GPP TSG RAN WG1 Meeting #48, Feb. 2007.
Bo Goransson et al., "Evolution of WCDMA High Speed Packet Access and Broadcast Services", IEEE 8th Workshop on Signal Processing Advances in Wireless Communications, Jun. 2007, XP-031189506.
IEEE, "Part 16: Air Interface for Broadband Wireless Access Systems", P802.16Rev2/D0b, Jun. 2007, XP-017631176.
Japan Patent Office Application Serial No. 2010-520944, Office Action dated Oct. 15, 2012, 4 pages.
United States Patent and Trademark Office U.S. Appl. No. 12/669,441, Final Office Action dated Nov. 21, 2012, 61 pages.
United States Patent and Trademark Office U.S. Appl. No. 12/673,438, Final Office Action dated Oct. 5, 2012, 27 pages.
Texas Instruments, "Views on MIMO-Related UE Feedback," 3GPP TSG RAN WG1 47bis, R1-070273, Jan. 2007, 3 pages.
LG Electronics, "CQI overhead reduction for MIMO in frequency domain," 3GPP TSG RAN WG1 #48bis, R1-071545, Mar. 2007, 5 pages.
Japan Patent Office Application Serial No. 2010-520944 Office Action dated Jun. 11, 2013, 10 pages.
United States Patent and Trademark Office U.S. Appl. No. 12/673,745, Office Action dated Mar. 1, 2013, 11 pages.
Japan Patent Office Application Serial No. 2010-520944, Office Action dated Jan. 22, 2013, 6 pages.
State Intellectual Property Office of the People's Republic of China Application Serial No. 200880112054.X Office Action dated Feb. 1, 2013, 8 pages.
United States Patent and Trademark Office U.S. Appl. No. 12/532,733, Final Office Action dated Mar. 13, 2013, 8 pages.
United States Patent and Trademark Office U.S. Appl. No. 12/526,499, Notice of Allowance dated Feb. 19, 2014, 11 pages.
Korean Intellectual Property Office Application Serial No. 10-2008-0009040, Notice of Allowance dated Feb. 25, 2014, 2 pages.
Korean Intellectual Property Office Application Serial No. 10-2008-0055497, Office Action dated Mar. 31, 2014, 4 pages.

(56) References Cited

OTHER PUBLICATIONS

United States Patent and Trademark Office U.S. Appl. No. 12/526,499 Office Action dated Jul. 15, 2013, 11 pages.
United States Patent and Trademark Office U.S. Appl. No. 13/553,493, Office Action dated Sep. 5, 2013, 9 pages.
United States Patent and Trademark Office U.S. Appl. No. 12/669,759, Final Office Action dated Oct. 16, 2013, 15 pages.
United States Patent and Trademark Office U.S. Appl. No. 13/553,493, Notice of Allowance dated Jan. 17, 2014, 14 pages.
Texas Instruments, "Views on MIMO-Related UE Feedback", R1-070273, 3GPP TSG RAN WG1 47bis, Jan. 2007, 3 pages.
Japan Patent Office Application Serial No. 2010-520944, Office Action dated Jan. 7, 2014, 19 pages.
3rd Generation Partnership Project, "Technical Specification Group Radio Access Network; LTE Physical Layer—General Description (Release 8)", R1-071252, 3GPP TS 36.201, V0.3.1, Feb. 2007, 12 pages.
LTE Rapporteur (NTT DoCoMo), "Text proposal for TS 36.300 (Stage 2 TS)", R1-071251, 3GPP TSG RAN WG1 Meeting #48, Feb. 2007, XP050105206, 14 pages.
Samsung, "Data and Control Channel Multiplexing in SC-FDMA for EUTRA Uplink", R1-051343, 3GPP TSG RAN WG1 Meeting #43, Nov. 2005, XP002450962, 2 pages.
3rd Generation Partnership Project, "Technical Specification Group Radio Access Network; Physical Layer Aspects for Evolved UTRA (Release 7)", 3GPP TR 25.814, V1.0.1, Nov. 2005, XP002436402, 72 pages.
NTT DoCoMo, et al., "Multiplexing Method of Shared Control Channel in Uplink Single-Carrier FDMA Radio Access", R1-051143, TSG-RAN WG1 #42bis, Oct. 2005, XP002450609, 9 pages.
Interdigital Communications Corporation, "Uplink MIMO SC-FDMA Scheme for EUTRA", R1-051368, 3GPP TSG RAN WG1 #43, Nov. 2005, XP002439856, 6 pages.
European Patent Office Application Serial No. 08723799.6, Certificate dated Jan. 8, 2014, 34 pages.
Korean Intellectual Property Office Application Serial No. 10-2008-0069668, Office Action dated Dec. 18, 2013, 4 pages.
Ericsson, "Extending Codeword to Layer Mapping for Efficient Support of Retransmisisons," 3GPP TSG-RAN WG1 #50, R1-073735, Aug. 2007, 2 pages.
Texas Instruments, "Aspects of Codebook-based Pre-coding for E-Utra MIMO," 3GPP TSG RAN WG1 47, R1-063238, Nov. 2006, 3 pages.
Korean Intellectual Property Office Application U.S. Appl. No. 10-2008-0069668, Notice of Allowance dated May 19, 2014, 3 pages.
Korean Intellectual Property Office Application U.S. Appl. No. 10-2008-0055497, Notice of Allowance dated Jun. 5, 2014, 2 pages.

* cited by examiner

Fig. 22

1st subframe / SRS

| group 2,3 | group 6 |
|---|---|
| group 4 | group 7, 8 |
| group 5 | group 9 |
|  |  |
| group 6 | group 2,3 |
| group 7, 8 | group 4 |
| group 9 | group 5 |

2nd subframe / SRS

| group 1, 3 | group 7, 8 |
|---|---|
| group 4, 5 | group 9 |
|  |  |
| group 7, 8 | group 1, 3 |
| group 9 | group 4, 5 |

1st subframe — SRS

| group 2,3 | group 6 |
| --- | --- |
| group 4 | group 7, 8 |
| group 5 | group 9 |
|  |  |
| group 9 | group 5 |
| group 7, 8 | group 4 |
| group 6 | group 2,3 |

2nd subframe — SRS

| group 1, 3 | group 7, 8 |
| --- | --- |
| group 4, 5 | group 9 |
|  |  |
| group 9 | group 4, 5 |
| group 7, 8 | group 1, 3 |

METHOD OF TRANSMITTING SOUNDING REFERENCE SIGNAL IN WIRELESS COMMUNICATION SYSTEM

CROSS-REFERENCE TO RELATED APPLICATIONS

This application is the National Stage filing under 35 U.S.C. 371 of international application No. PCT/KR2008/001771, filed on Mar. 28, 2008, which claims the benefit of U.S. provisional application Ser. Nos. 60/908,939, filed on Mar. 29, 2007, 60/944,802, filed on Jun. 19, 2007, 60/955,863, filed on Aug. 14, 2007, 60/956,382, filed on Aug. 16, 2007, 60/970,535, filed on Sep. 7, 2007, 60/983,216, filed on Oct. 28, 2007, and 60/989,417, filed on Nov. 20, 2007, and which also claims the benefit of earlier filing date and right of priority to Korean Patent Application Nos. 10-2007-0057465, filed on Jun. 12, 2007 and 10-2008-0029222, filed on Mar. 28, 2008, the contents of all of which are hereby incorporated by reference herein in their entirety.

TECHNICAL FIELD

The present invention relates to wireless communication, and more particularly, to a method of transmitting a sounding reference signal in a wireless communication system.

BACKGROUND ART

In next generation wireless communication systems, multimedia data can be transmitted with high quality at a high speed under limited radio resources. To achieve this, spectral efficiency needs to be maximized since a radio channel has a limited bandwidth. In addition, inter-symbol interference and frequency selective fading, which occur during high-speed transmission, need to be overcome.

In order to improve performance of the wireless communication system, a closed-loop transmission scheme using channel condition between a base station (BS) and a user equipment (UE) has been introduced. An adaptive modulation and coding (AMC) scheme improves link performance by adjusting modulation and coding scheme (MCS) by using feedback of channel condition information.

In general, the UE informs the BS of downlink channel condition in a well-known format, e.g., a channel quality indicator (CQI). The BS can receive the downlink channel condition from all UEs and perform frequency selective scheduling. To perform the frequency selective scheduling in uplink, the BS has to know uplink channel condition.

A reference signal is used to estimate the channel condition. The reference signal is previously known to both the BS and the UE, and is also referred to as a pilot. An uplink reference signal has two types of signals, i.e., a demodulation reference signal and a sounding reference signal. The demodulation reference signal is used to estimate a channel for data demodulation. The sounding reference signal is used in user scheduling irrespective of data transmission.

A variety of uplink control signal is transmitted on uplink control channel. Examples of the uplink control signal are an acknowledgment (ACK)/not-acknowledgement (NACK) signal used to perform hybrid automatic repeat request (HARQ), a channel quality indicator (CQI) indicating downlink channel quality, a precoding matrix index (PMI), a rank indicator (RI), etc.

Uplink transmission is performed by the UE. Thus, it is important for the UE to have low peak-to-average power ratio (PAPR) in order to decrease battery consumption. For this, a modulation scheme having a single carrier characteristic can be used in uplink transmission. The sounding reference signal is not related to uplink control signal. Therefore, when the sounding reference signal is transmitted on the uplink control channel, it is difficult to preserve the single carrier characteristic. In addition, if the uplink control signal and the sounding reference signal are separately transmitted, it is difficult to improve spectral efficiency.

DISCLOSURE OF INVENTION

Technical Problem

A method is sought for transmitting a sounding reference signal together with uplink control signal in a wireless communication system.

Technical Solution

In an aspect, a method of transmitting a sounding reference signal in a wireless communication system is provided. The method includes generating a physical uplink control channel (PUCCH) carrying uplink control information on a subframe, the subframe comprising a plurality of SC-FDMA (single carrier-frequency division multiple access) symbols, wherein the uplink control information is punctured on one SC-FDMA symbol in the subframe, and transmitting simultaneously the uplink control information on the PUCCH and a sounding reference signal on the punctured SC-FDMA symbol.

The subframe may be composed of two slots, and the PUCCH may use one resource block in each of the two slots in the subframe. The uplink control information may be spread by orthogonal sequences with different lengths in each of the two slots in the subframe.

In still another aspect, a method of transmitting a sounding reference signal in a wireless communication system is provided. The method includes generating a physical uplink control channel (PUCCH) carrying uplink control information on a subframe, the subframe comprising a first slot and a second slot, a slot comprising a plurality of SC-FDMA symbols, the uplink control information spread by a first orthogonal sequence in the first slot and a second orthogonal sequence in the second slot, wherein the length of the first orthogonal sequence is shorter than that of the second orthogonal sequence; and transmitting the uplink control information on the PUCCH and the sounding reference signal on a SC-FDMA symbol of the first slot.

The first orthogonal sequence may be selected from a set of orthogonal sequences $\{(1, 1, 1), (1, e^{j2\pi/3}, e^{j4\pi/3}), (1, e^{j4\pi/3}, e^{j2\pi/3})\}$, and the second orthogonal sequence may be selected from a set of orthogonal sequences $\{(1, 1, 1, 1), (1, -1, 1, -1), (1, -1, -1, 1)\}$ In still another aspect, a method of receiving a sounding reference signal in a wireless communication system is provided. The method includes receiving uplink control information on a physical uplink control channel (PUCCH), the PUCCH comprising a plurality of SC-FDMA symbols, wherein one SC-FDMA symbol is punctured, and receiving a sounding reference signal on the punctured SC-FDMA symbol.

Advantageous Effects

Uplink control information and a sounding reference signal can be simultaneously transmitted without affecting a single carrier characteristic, thereby reducing battery consumption of a user equipment. In addition, spectral efficiency can be improved, and a scheduling overhead due to the transmission of the sounding reference signal can be reduced.

BRIEF DESCRIPTION OF THE DRAWINGS

FIG. 22 shows an example of transmission of a signal reference signal with respect to 9 UE groups.

MODE FOR THE INVENTION

In the following disclosure, downlink represents a communication link from a base station (BS) to a user equipment (UE), and uplink represents a communication link from the UE to the BS. In downlink, a transmitter may be a part of the BS, and the receiver may be a part of the UE. In uplink, the transmitter may be a part of the UE, and a receiver may be a part of the BS. The UE may be fixed or mobile, and may be referred to as another terminology, such as a mobile station (MS), a user terminal (UT), a subscriber station (SS), a wireless device, etc. The BS is generally a fixed station that communicates with the UE and may be referred to as another terminology, such as a node-B, a base transceiver system (BTS), an access point, etc. There are one or more cells within the coverage of the BS.

Figure 1:
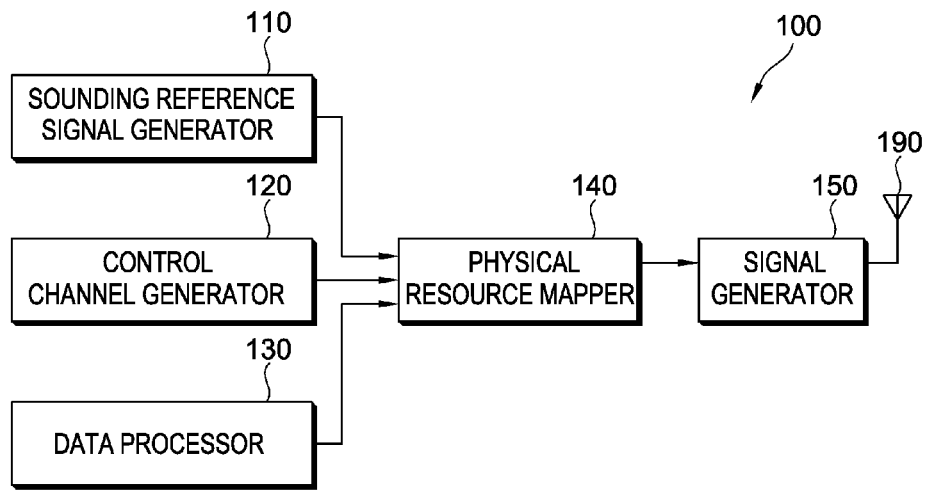
FIG. 1 is a block diagram of a transmitter according to an embodiment of the present invention.

FIG. 1 is a block diagram of a transmitter according to an embodiment of the present invention.

Referring to FIG. 1, a transmitter 100 includes a sounding reference signal generator 110, a control channel generator 120, a data processor 130, a physical resource mapper 140, and a signal generator 150.

The sounding reference signal generator 110 generates a sounding reference signal. A reference signal has two types of signals, i.e., a demodulation reference signal and the sounding reference signal. The demodulation reference signal is used in channel estimation for data demodulation. The sounding reference signal is used in uplink scheduling. A reference signal sequence used by the demodulation reference signal may be the same as that used by the sounding reference signal.

The control channel generator 120 generates a physical uplink control channel (PUCCH) for carrying uplink control information.

The data processor 130 processes user data and thus generates complex-valued symbols. The physical resource mapper 140 maps the sounding reference signal, the control channel, and/or the complex-valued symbols for the user data onto physical resources. The physical resources may be resource elements or subcarriers.

The signal generator 150 generates time-domain signals to be transmitted through a transmit antenna 190. The signal generator 150 may generate the time-domain signals by using a single carrier-frequency division multiple access (SC-FDMA) scheme. The time-domain signal output from the signal generator 150 is referred to as an SC-FDMA symbol or an orthogonal frequency division multiple access (OFDMA) symbol.

It will be assumed hereinafter that the signal generator 150 uses the SC-FDMA scheme. However, this is for exemplary purposes only, and thus the present invention may also apply to other multiple-access schemes. For example, the present invention may apply to various multiple-access schemes such as OFDMA, code division multiple access (CDMA), time division multiple access (TDMA), and frequency division multiple access (FDMA).

Figure 2:
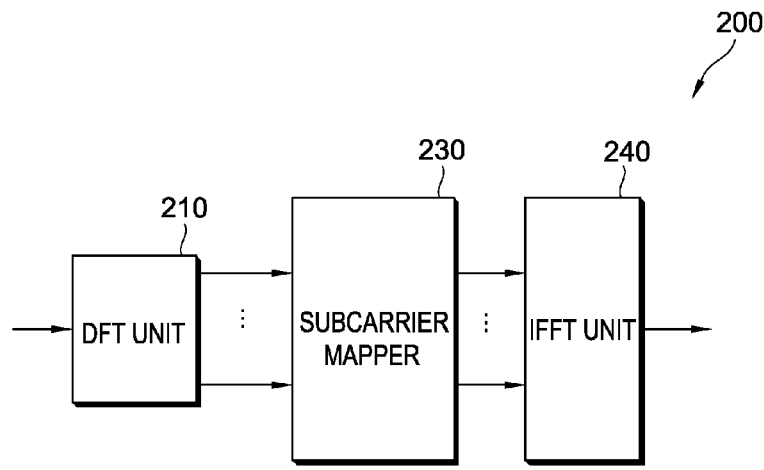
FIG. 2 is a block diagram of a signal generator according to a single carrier-frequency division multiple access (SC-FDMA) scheme.

FIG. 2 is a block diagram of a signal generator according to an SC-FDMA scheme.

Referring to FIG. 2, a signal generator 200 includes a discrete Fourier transform (DFT) unit 220 that performs DFT, a subcarrier mapper 230, and an inverse fast Fourier transform (IFFT) unit 240 that performs IFFT. The DFT unit 220 performs DFT on input data and thus outputs frequency-domain symbols. The subcarrier mapper 230 maps the frequency-domain symbols onto respective subcarriers. The IFFT unit 230 performs IFFT on input symbols and thus outputs time-domain signals.

Figure 3:
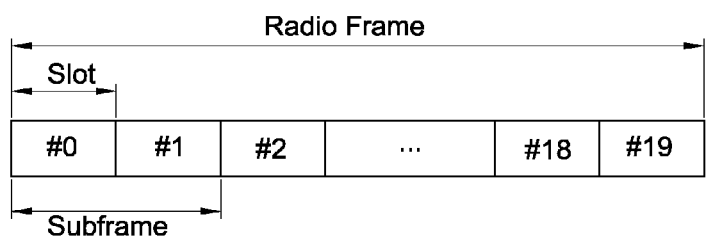
FIG. 3 shows a structure of a radio frame.

FIG. 3 shows a structure of a radio frame.

Referring to FIG. 3, the radio frame includes 10 subframes. One subframe includes two slots. A time for transmitting one subframe is defined as a transmission time interval (TTI). For example, one subframe may have a length of 1 ms, and one slot may have a length of 0.5 ms. One slot includes a plurality of SC-FDMA symbols in a time domain and a plurality of resource blocks in a frequency domain.

The radio frame of FIG. 3 is shown for exemplary purposes only. Thus, the number of subframes included in the radio frame or the number of slots included in the subframe or the number of SC-FDMA symbols included in the slot may be modified in various manners.

Figure 4:
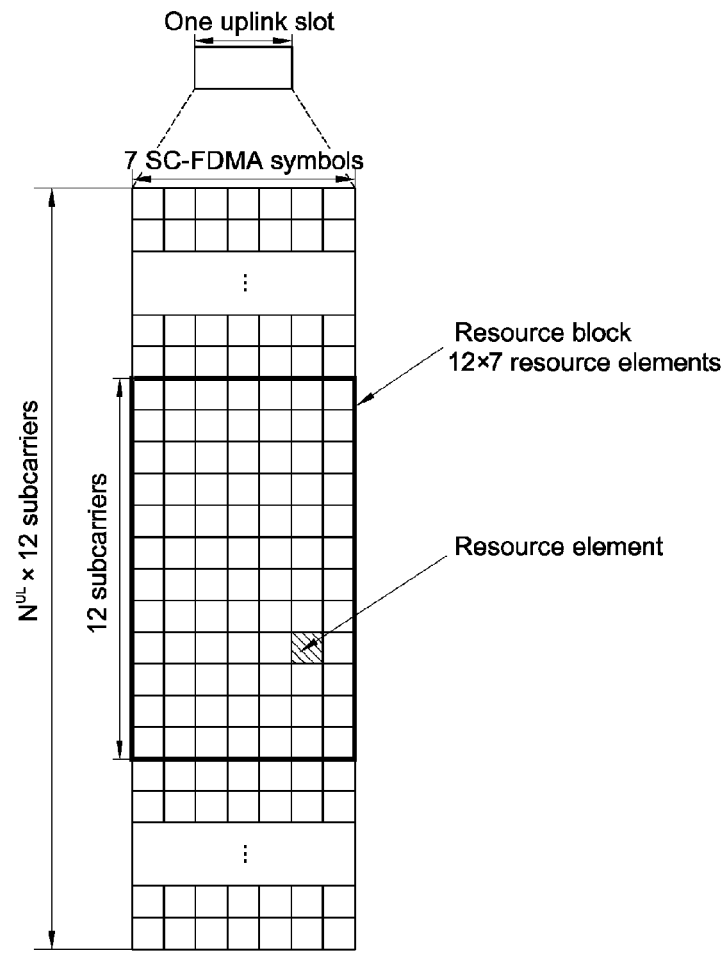
FIG. 4 shows an example of a resource grid for one uplink slot.

FIG. 4 shows an example of a resource grid for one uplink slot.

Referring to FIG. 4, the uplink slot includes a plurality of SC-FDMA symbols in a time domain and a plurality of resource blocks in a frequency domain. It is shown in FIG. 4 that one uplink slot includes 7 SC-FDMA symbols and one resource block includes 12 subcarriers. However, this is for exemplary purposes only, and thus the present invention is not limited thereto.

Each element of the resource grid is referred to as a resource element. One resource block includes 12×7 resource elements. The number NUL of resource blocks included in the uplink slot is dependent on an uplink transmission bandwidth determined in a cell.

Figure 5:
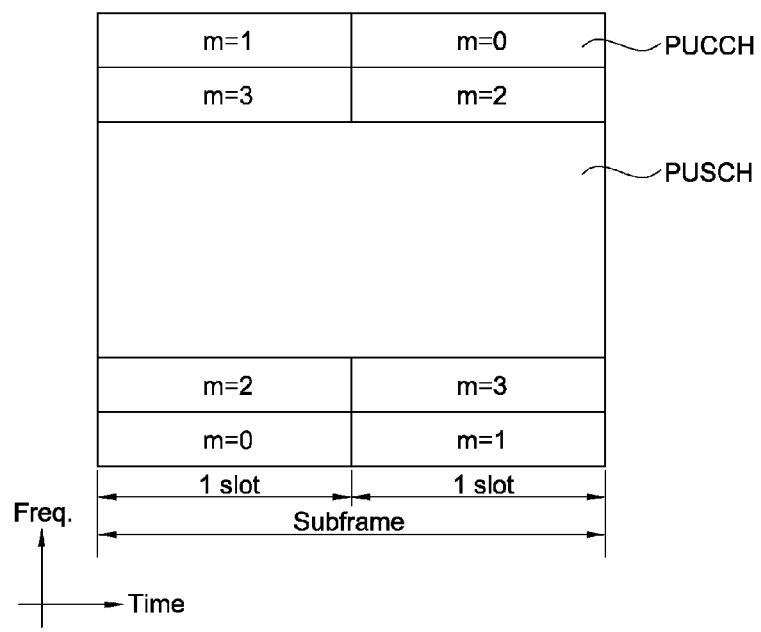
FIG. 5 shows a structure of an uplink subframe.

FIG. 5 shows a structure of an uplink subframe.

Referring to FIG. 5, an uplink subframe is divided into a control region assigned to a physical uplink control channel (PUCCH) for carrying uplink control information and a data region assigned to a physical uplink shared channel (PUSCH) for carrying user data. A middle portion of the subframe is assigned to the PUSCH. Both sides of the uplink subframe are assigned to the PUCCH. One UE does not simultaneously transmit the PUCCH and the PUSCH.

Example of the uplink control information transmitted on the PUCCH are an acknowledgment (ACK)/not-acknowledgement (NACK) signal used to perform hybrid automatic repeat request (HARM), a channel quality indicator (CQI) indicating a downlink channel condition, a scheduling request signal used to request uplink radio resource allocation, etc.

The PUCCH for one UE uses one resource block which occupies a different frequency in each of two slots in the subframe. The two slots use different resource blocks (or subcarriers) in the subframe. This is said that the two resource blocks assigned to the PUCCH are frequency-hopped in a slot boundary. It is assumed herein that the PUCCH is assigned to the subframe for 4 UEs respectively in association with a PUCCH (m=0), a PUCCH (m=1), a PUCCH (m=2), and a PUCCH (m=3).

The PUCCH can support multiple formats. That is, the uplink control information having a different bit number for each subframe can be transmitted according to a modulation scheme. For example, when binary phase shift keying (BPSK) is used, 1-bit uplink control information can be transmitted on the PUCCH, and when Quadrature phase shift keying (QPSK) is used, 2-bit uplink control information can be transmitted on the PUCCH.

Figure 6:
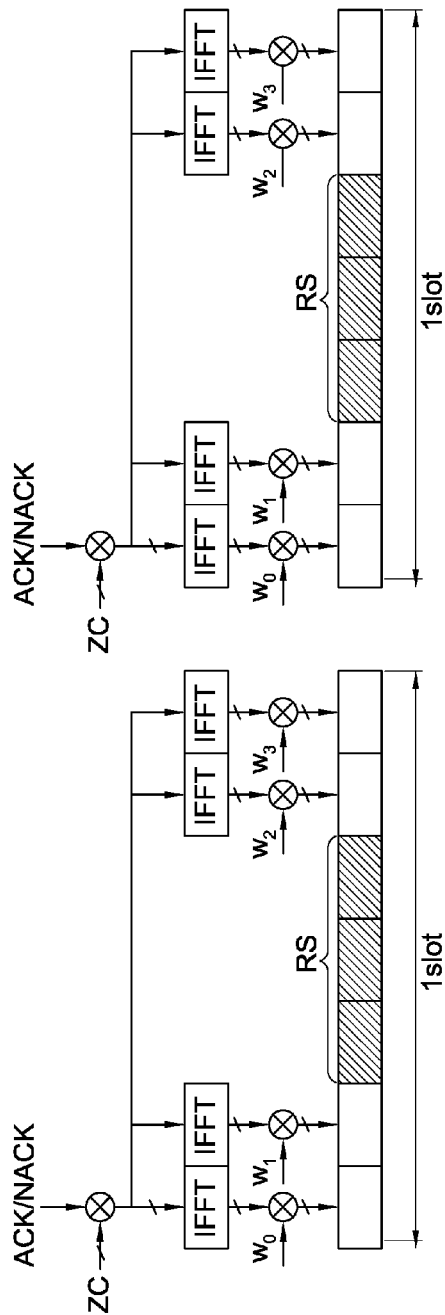
FIG. 6 shows a structure of an acknowledgment (ACK)/not-acknowledgement (NACK) channel in a subframe.

FIG. 6 shows a structure of an ACK/NACK channel in a subframe. The ACK/NACK channel is a control channel for transmitting an ACK/NACK signal on a PUCCH. The ACK/NACK signal is 1-bit or 2-bit uplink control information. For clarity, it is assumed that one slot includes 7 SC-FDMA symbols and one subframe includes two slots. When a control signal is transmitted in a pre-allocated band, frequency-domain spreading and time-domain spreading are simultaneously used to increase the number of multiplexible UEs or the number of control channels.

Referring to FIG. 6, among the 7 SC-FDMA symbols included in one slot, a demodulation reference signal (indicated by RS in the figure) is carried on 3 SC-FDMA symbols and the ACK/NACK signal is carried on the remaining 4 SC-FDMA symbols. The demodulation reference signal is carried on 3 contiguous SC-FDMA symbols. A location and the number of symbols used in the demodulation reference signal may vary. As a result, a location and the number of symbols used in the ACK/NACK signal may also vary. The ACK/NACK signal is a transmission and/or reception confirm signal for downlink data.

A frequency-domain spreading code is used to spread the ACK/NACK signal in the frequency domain. A first orthogonal code is used as the frequency-domain spreading code. A Zadoff-Chu (ZC) sequence is one of constant amplitude zero auto-correlation (CAZAC) sequences and is used as the first orthogonal code. However, this is for exemplary purposes only, and thus other sequences having excellent correlation characteristics can also be used. In particular, each control channel can be identified by using a ZC sequence having a different cyclic shift value.

A ZC sequence c(k) having a length of N can be generated according to the following equation:

MathFigure 1

$$c(k) = \begin{cases} e^{-j\frac{\pi Mk(k+1)}{N}} & \text{for odd } N \\ e^{-j\frac{\pi Mk^2}{N}} & \text{for even } N \end{cases} \quad [\text{Math.1}]$$

where $0 \leq k \leq N-1$, and M is a root index and is a natural number equal to or less than N, where N is relatively prime to M. This means that, once N is determined, the number of root indices is equal to the number of available ZC sequences.

The ZC sequence c(k) has three characteristics as follows.

MathFigure 2

$$|c(k; N, M)| = 1 \quad \text{for all } k, N, M \quad [\text{Math.2}]$$

MathFigure 3

$$R_{M;N}(d) = \begin{cases} 1, & \text{for } d = 0 \\ 0, & \text{for } d \neq 0 \end{cases} \quad [\text{Math.3}]$$

MathFigure 4

$$R_{M_1, M_2; N}(d) = p \quad \text{for all } M_1, M_2 \quad [\text{Math.4}]$$

Equation 2 shows that the ZC sequence always has a magnitude of '1'. Equation 3 shows that auto-correlation of the ZC sequence is indicated by a Dirac-delta function. The auto-correlation is based on circular correlation. Equation 4 shows that cross correlation is always constant.

The ACK/NACK signal is spread over the frequency domain and is undergone IFFT. Thereafter, the ACK/NACK signal is spread over the time domain by using a second orthogonal code which is a time-domain spreading code. The second orthogonal code may be a Walsh code. Herein, spreading is carried out by using 4 Walsh codes w0, w1, w2, and w3 for 4 SC-FDMA symbols, respectively. Although the Walsh code is used as the second orthogonal code, other codes having excellent correlation characteristics, such as the ZC sequence, may also be used.

Although it has been described that the frequency-domain spreading is performed before the time-domain spreading is performed, this is for exemplary purposes only. Thus, the present invention is not limited to the order of performing the frequency-domain spreading and the time-domain spreading. The time-domain spreading may be performed before the frequency-domain spreading is performed. The time-domain spreading and the frequency-domain spreading may be simultaneously performed by using one sequence having a combined format.

It has been described that the ZC sequence is used as the first orthogonal code which is the frequency-domain spreading code, and the Walsh code is used as the second orthogonal code which is the time-domain spreading code. However, the present invention is not limited thereto. Thus, a DFT code or other codes having excellent correlation characteristics may also be used.

The control information may be two-dimensionally spread over both the frequency domain and the time domain so that more number of UEs can be supported. Assume that 6 orthogonal codes can be used through cyclic shift when the frequency-domain spreading is performed by using the ZC sequence. For 3 demodulation reference signals, a total of 6×3=18 UEs can be supported by using a DFT-based spreading code in the time domain. In this case, the ACK/NACK signal to be transmitted uses an orthogonal code having a length of 4 as the time-domain spreading code, thereby enabling coherent detection.

Figure 7:
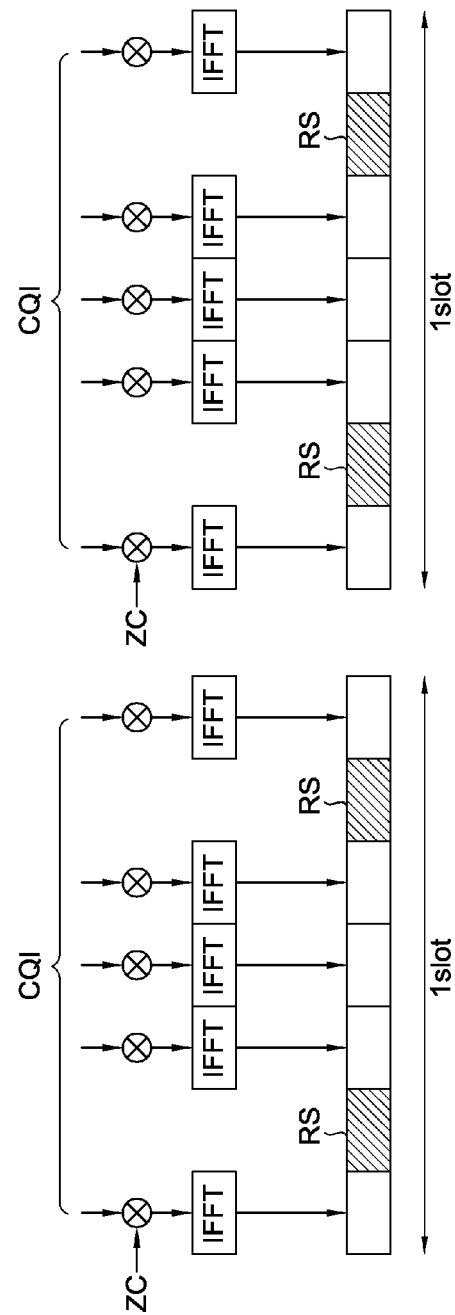
FIG. 7 shows a structure of a channel quality indicator (CQI) channel in a subframe.

FIG. 7 shows a structure of a CQI channel in a subframe. The CQI channel is a control channel for transmitting a CQI on a PUCCH.

Referring to FIG. 7, among 7 SC-FDMA symbols included in one slot, a demodulation reference signal (indicated by RS in the figure) is carried on 2 SC-FDMA symbols spaced apart from each other by 3 SC-FDMA symbols, and the CQI is carried on the remaining 5 SC-FDMA symbols. This is for exemplary purposes only, and thus a location and the number of SC-FDMA symbols used in the demodulation reference signal or a location or the number of symbols used in the CQI may vary. When QPSK mapping is performed on one SC-FDMA symbols, a 2-bit CQI value can be carried. Therefore, a 10-bit CQI value can be carried on one slot. For one subframe, a maximum 20-bit CQI value can be carried. In addition to the QPSK, the CQI may use other modulation schemes, e.g., 16-quadrature amplitude modulation (QAM).

The CQI is spread over a frequency domain by using a frequency-domain spreading code. The frequency-domain spreading code may be a ZC sequence.

Unlike the two-dimensional spreading in the ACK/NACK channel, the CQI channel uses only one-dimensional spreading and thus increases CQI transmission capacity. Although only the frequency-domain spreading is described herein as an example, the CQI channel may also use time-domain spreading.

A specific type of a control signal as well as other types of control signals can be multiplexed in one control channel. For example, both a CQI signal and an ACK/NACK signal can be multiplexed in one control channel.

Now, a subframe structure and a control channel structure for transmitting a sounding reference signal will be described.

Figure 8:
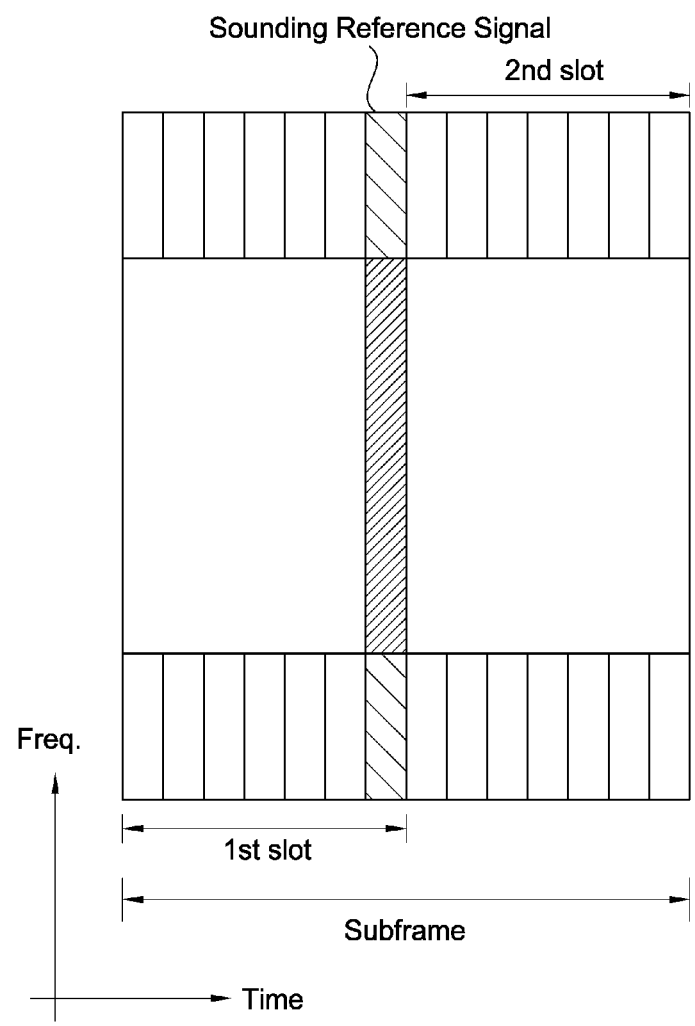
FIG. 8 shows an example of a subframe for transmitting a sounding reference signal.

FIG. 8 shows an example of a subframe for transmitting a sounding reference signal. The subframe may be an uplink subframe.

Referring to FIG. 8, the sounding reference signal is transmitted on one SC-FDMA symbol. There is no limit in a location and the number of SC-FDMAs in which the sounding reference signal is arranged. Thus, the sounding reference signal may be transmitted in two or more SC-FDMA symbols. The sounding reference signal is transmitted by a UE to a BS so that an uplink channel response can be measured as accurately as possible for uplink scheduling. The sounding reference signal may be transmitted one time throughout the entire uplink frequency band or may be transmitted sequentially several times throughout a plurality of frequency bands.

The sounding reference signal occupies one SC-FDMA symbol in one subframe. Therefore, the sounding reference signal is transmitted in any one of two slots. Depending on systems, it is not mandatory to transmit the sounding reference signal in every subframe. The sounding reference signal may be periodically or non-periodically transmitted.

A UE cannot simultaneously transmit a PUCCH and a PUSCH. Therefore, the UE can simultaneously transmit the sounding reference signal and the PUCCH and also can simultaneously transmit the sounding reference signal and the PUSCH, but cannot simultaneously transmit the sounding reference signal, the PUCCH, and the PUSCH.

The sounding reference signal can be transmitted in a specific SC-FDMA symbol of a first slot adjacent to a second slot. This is for exemplary purposes only, and thus the sounding reference signal may be transmitted in any SC-FDMA symbols of the first slot. For example, the sounding reference signal may be transmitted in a first SC-FDMA symbol or a last SC-FDMA symbol in the subframe.

Orthogonality of control information transmitted on the control channel can be maintained when neither the demodulation reference signal nor any other control information is multiplexed in the SC-FDMA symbol on which the sounding reference signal is transmitted. That is, in the ACK/NACK channel or the CQI channel, systems are managed by designing a channel format such that none of the ACK/NACK signal, the CQI, and the demodulation reference signal is arranged in the SC-FDMA symbol on which the sounding reference signal is arranged. Alternatively, the systems are managed so that a resource region is not generated in which the control information and the sounding reference signal overlap with each other. For this, when the resource region (e.g., SC-FDMA symbol) in which the sounding reference signal is assigned is pre-arranged with the ACK/NACK signal or the CQI, the overlapping resource region is punctured.

It is possible to allow the sounding reference signal not to be transmitted through the resource block allocated with the PUCCH. Alternatively, the sounding reference signal may be transmitted through the resource block allocated with the PUCCH.

Figure 9:
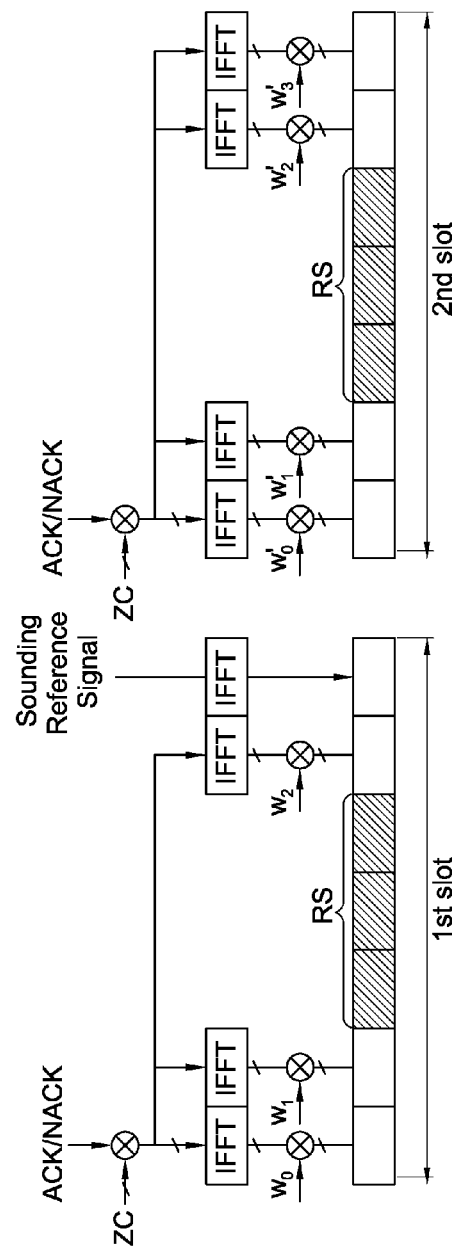
FIG. 9 shows a structure of an ACK/NACK channel that can be transmitted simultaneously with a sounding reference signal.

FIG. 9 shows a structure of an ACK/NACK channel that can be transmitted simultaneously with a sounding reference signal.

Referring to FIG. 9, a sounding reference signal is transmitted on one SC-FDMA symbol of a first slot. One of SC-FDMA symbols for transmitting an ACK/NACK signal is punctured. The ACK/NACK signal is asymmetrically spread between two slots. This is because the ACK/NACK signal is spread throughout 3 SC-FDMA symbols in the first slot and is spread throughout 4 SC-FDMA symbols in a second slot.

In a pair of slots, spreading is performed by using orthogonal sequences each having a different length. For example, in the first slot, a spreading sequence ($w_0$, $w_1$, $w_2$) can be selected from a set of spreading sequences $\{(1, 1, 1), (1, e^{j2\pi/3}, e^{j4\pi/3}), (1, e^{j4\pi/3}, e^{j2\pi/3})\}$. In the second slot, a spreading sequence $(w'_0, w'_1, w'_2, w'_3)$ can be selected from a set of spreading sequences $\{(1, 1, 1, 1), (1, -1, 1, -1), (1, -1, -1, 1)\}$.

The sounding reference signal can use a ZC sequence and is mapped to an SC-FDMA symbol after performing IFFT. Herein, as an example of using a frequency-domain signal as the sounding reference signal, IFFT is performed on the sounding reference signal. However, when a time-domain signal is used as the sounding reference signal, IFFT may not be performed.

In the ACK/NACK channel, the ACK/NACK signal is spread over both time domain and frequency domain. Therefore, to preserve orthogonality of the ACK/NACK signal, there should be no UE that transmits the ACK/NACK signal on the SC-FDMA symbol for transmitting the sounding reference signal. That is, in a case where the sounding reference signal and the ACK/NACK signal are simultaneously transmitted, all UEs within a cell use the ACK/NACK channel having the same puncture structure.

Herein, a last SC-FDMA symbol of the first slot is punctured for the sounding reference signal. However, a location of the punctured SC-FDMA symbol is not limited thereto. Therefore, for the sounding reference signal, the punctured SC-FDMA symbol may be a first SC-FDMA symbol of the first slot or a last SC-FDMA symbol of the second slot.

Figure 10:
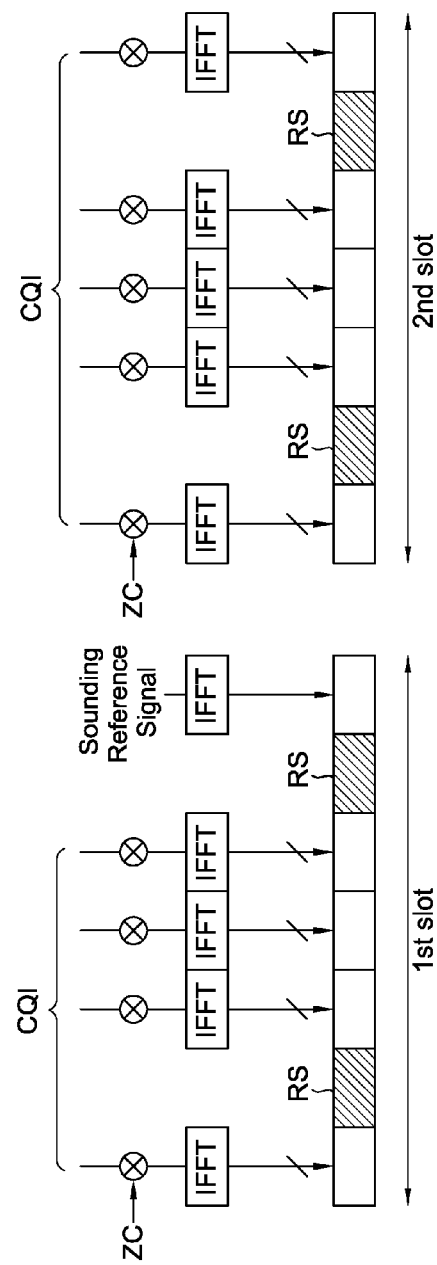
FIG. 10 shows a structure of a CQI channel that can be transmitted simultaneously with a sounding reference signal.

FIG. 10 shows a structure of a CQI channel that can be transmitted simultaneously with a sounding reference signal.

Referring to FIG. 10, a sounding reference signal is transmitted on one SC-FDMA symbol of a first slot. One of SC-FDMA symbols for CQI transmission is punctured. The CQI is asymmetrically spread within one subframe. This is because the CQI is spread throughout 4 SC-FDMA symbols in the first slot and is spread throughout 5 SC-FDMA symbols in a second slot.

The sounding reference signal can use a ZC sequence and is mapped to an SC-FDMA symbol after performing IFFT. Unlink in the ACK/NACK channel, the CQI is spread only over a frequency domain. Thus, even if one UE simultaneously transmits the sounding reference signal together with the CQI, other UEs can use the existing CQI channel without alteration. Although the sounding reference signal and the CQI are simultaneously transmitted, it is not necessary for all UEs within the cell to use the same structured CQI channel.

As described above, a control channel that can be transmitted simultaneously with the sounding reference signal has a different structure from a control channel that cannot be transmitted simultaneously with the sounding reference signal. The control channel that cannot be transmitted simultaneously with the sounding reference signal is referred to as a symmetric control channel or a type-1 control channel. This is because, as shown in FIGS. 6 and 7, resource regions assigned to each of slots have the same size with respect to control information. In comparison thereto, the control channel that can be transmitted simultaneously with the sounding reference signal is referred to as an asymmetric control channel or a type-2 control channel. This is because, as shown in FIGS. 9 to 10, resource regions assigned to each slot have different sizes with respect to the control information.

Now, operations of a sounding reference signal and a control channel will be described.

According to a proposed PUCCH structure, in a resource region (i.e., an SC-FDMA symbol) through which the sounding reference signal is transmitted, control information is punctured so that the control information and the sounding reference signal are not simultaneously transmitted through the same resource region. For example, an ACK/NACK signal and the sounding reference signal are not simultaneously transmitted on the same SC-FDMA symbol. Further, a CQI and the sounding reference signal are not simultaneously transmitted on the same SC-FDMA symbol. Furthermore, a signal, in which the ACK/NACK signal and the CQI are multiplexed, and the sounding reference signal are not simultaneously transmitted on the same SC-FDMA symbol. Herein, the term 'simultaneously' means that signals are overlapped over time domain and/or frequency domain.

When the sounding reference signal is transmitted on a sounding SC-FDMA symbol, only the sounding reference signal is transmitted on the sounding SC-FDMA symbol. It can be said that the sounding SC-FDMA symbol is obtained by puncturing one SC-FDMA symbol in a PUCCH. In a resource region affected by the transmission of the sounding reference signal, a specific UE (in case of a CQI channel) or all UEs (in case of an ACK/NACK channel) configures a control channel by using the remaining SC-FDMA symbols other than the sounding SC-FDMA symbol.

Figure 11:
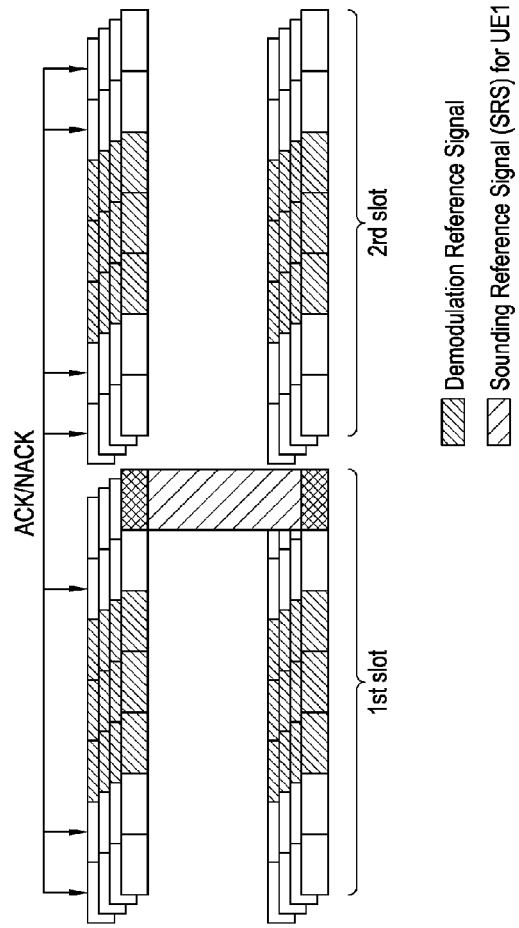
FIG. 11 shows an example of simultaneous transmission of a sounding reference signal and ACK/NACK information in a subframe.

FIG. 11 shows an example of simultaneous transmission of a sounding reference signal and ACK/NACK information in a subframe.

Referring to FIG. 11, when a first UE (hereinafter, simply referred to as a 'UE1') transmits a sounding reference signal (hereinafter, simply referred to as an 'SRS') on a sounding SC-FDMA symbol, the UE1 does not transmit an ACK/NACK signal on the sounding SC-FDMA symbol in order to preserve a single carrier characteristic of an SC-FDMA. Further, in order to maintain orthogonality, other UEs cannot transmit the SRS on the sounding SC-FDMA symbol.

When the ACK/NACK signal and the SRS are simultaneously transmitted, in order to maintain orthogonality with respect to one UE, another control information should not be transmitted at a time when another UE transmits the sounding SC-FDMA symbol. In addition, the signals should not overlap with each other in a frequency domain.

The SRS and the uplink control information (particularly, the ACK/NACK signal) can be multiplexed and transmitted in various manners as follows.

FIRST EMBODIMENT

Operation of Two-Types of Pucchs

Two types of PUCCHs are defined according to coexistence with an SRS in one subframe. For example, a type-1 control channel (or a symmetric control channel) cannot coexist with the SRS, and a type-2 control channel (or an asymmetric control channel) can coexist with the SRS.

Figure 12:
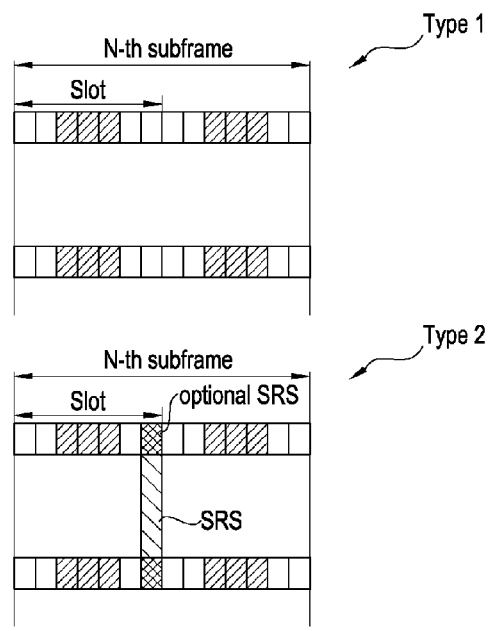
FIG. 12 shows an example of two-types of physical uplink control channels (PUCCHs).

FIG. 12 shows an example of the two-types of PUCCHs. The type-1 control channel is a general PUCCH which is used for an ACK/NACK channel when it is not necessary to simultaneously transmit an ACK/NACK signal and the SRS in at least one resource block of an arbitrary subframe. During the subframe in which the type-1 control channel is used, another UE can transmit the SRS by using the resource block. The type-2 control channel is an optional PUCCH provided in consideration of the transmission of the SRS. A first slot includes an SC-FDMA symbol that is punctured to transmit the SRS. A spreading factor (SF) of a region for transmitting the ACK/NACK signal is 3 in the first slot and is 4 in a second slot.

In order for a BS to successfully receive the SRS, a scheduling scheme or a predetermined rule is required so that UEs do not use both the type-1 control channel and the type-2 control channel together in the same resource block. Different types of control information can be used in different resource blocks.

Figure 13:
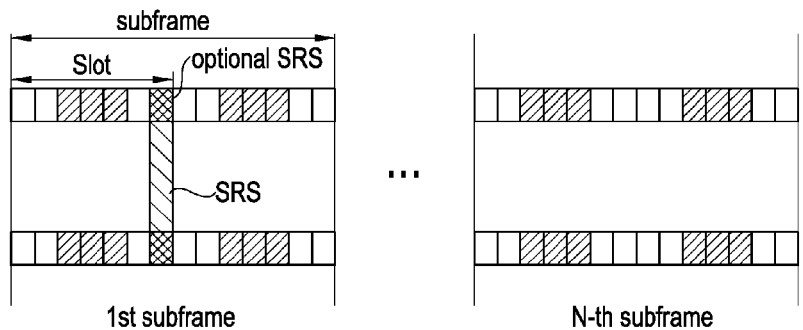
FIG. 13 shows an example for describing a case where a user equipment (UE) can know the presence of signaling from a base station (BS) without the aid of other elements and an opposite case.

FIG. 13 shows an example for describing a case where a UE can know the presence of signaling from a BS without the aid of other elements and an opposite case. If the UE in the cell knows SRS transmission timings for both the UE itself and other UEs, additional scheduling or signaling is unnecessary. This is because the UEs can autonomously select a PUCCH type on the basis of the SRS transmission timings. The UEs in the cell simultaneously transmit an ACK/NACK signal and an SRS on a type-2 control channel in a first subframe, and transmit the ACK/NACK signal on the type-1 control channel in an N-th subframe. In this case, the type-1 control channel and the type-2 control channel do not coexist in one subframe.

Figure 14:
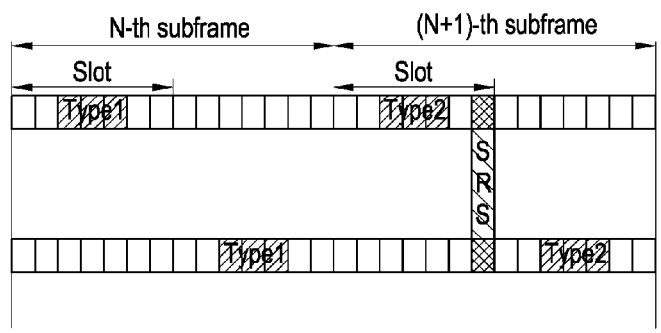
FIG. 14 shows an example of a case where a type-1 control channel and a type-2 control channel do not coexist in one subframe.

FIG. 14 shows an example of a case where a type-1 control channel and a type-2 control channel do not coexist in one subframe. In an N-th subframe, an SRS is not transmitted on the type-1 control channel. When the type-2 control channel is used in an (N+1)-th subframe, uplink control information and the SRS can be simultaneously transmitted.

In addition, system operations can be carried out by predetermining a ratio according to the types of control channels described in the embodiments of FIGS. 13 and 14. For example, if the type-1 control channel is used in first transmission, the type-2 control channel can be used in second and third transmissions so that a ratio of the type-1 control channel to the type-2 control channel is 1:2. For another example, the two types of control channels may be alternately used so that the ratio of the type-1 control channel to the type-2 control channel can be 1:1 or another ratio.

Figure 15:
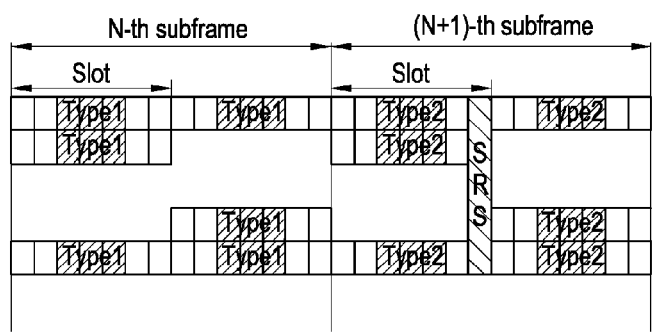
FIG. 15 shows another example of a case where a type-1 control channel and a type-2 control channel do not coexist in one subframe.

FIG. 15 shows another example of a case where a type-1 control channel and a type-2 control channel do not coexist in one subframe. In an N-th subframe, an SRS is not transmitted on the type-1 control channel. When the type-2 control channel is used in an (N+1)-th subframe, uplink control information and the SRS can be simultaneously transmitted. In this case, since a sounding SC-FDMA symbol is not punctured in the type-2 control channel, the SRS can be transmitted at one time on a PUCCH and a PUSCH. This is an example for showing how the SRS can be transmitted efficiently in a typical situation where a plurality of resource blocks have to be used due to the increase in the number of control channels or where the resources blocks have to be asymmetrically allocated at both sides of a frequency domain. In this situation, the SRS is transmitted throughout the entire band.

Figure 16:
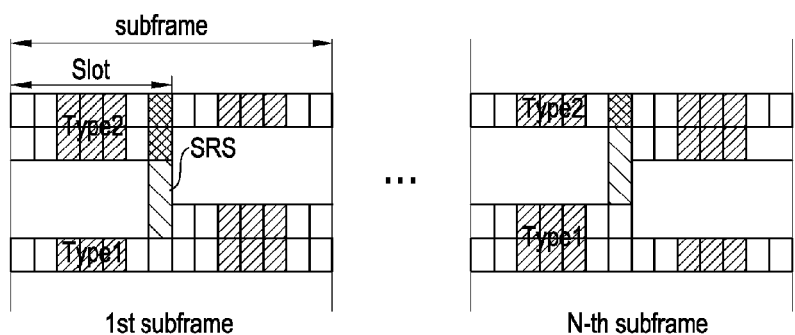
FIG. 16 shows an example for describing different types of operations.

FIG. 16 shows an example for describing different types of operations. UEs belonging to a group 1 may use a type-1 control channel. UEs belonging to a group 2 may use a type-2 control channel. Thus, the type-1 control channel and the type-2 control channel can coexist in one subframe. In this case, the SRS is transmitted through only the remaining regions (e.g., inner regions) other than regions used by the control channels. The remaining regions can be defined in various manners. This is because the number of resource blocks used by the control channels varies. Thus, the remaining regions may be defined such that a bandwidth of the SRS varies along with the variation of the number of resource blocks. Further, an arbitrary in-band may be determined and used in the operations. Various operation methods can be provided to facilitate operations of a sounding band. For example, if the control channels use M resource blocks out of a total of N resource blocks, the SRS is transmitted by using approximately (N−M) sounding bands. Exact adjustment a value of (N−M) may be difficult. In this case, an approximate value may be used to facilitate transmission and multiplexing of the SRS.

A sounding indicator is a field by which a BS informs the UE of a control channel type. The sounding indicator may be a part of system information and may be transmitted by using a broadcast channel, a downlink control channel, a radio resource control (RRC) message, etc. The sounding indicator may be periodically or occasionally transmitted. Further, the sounding indicator may be transmitted at the request of the UE or irrespective of the request of the UE.

There is no limit in a bit number of the sounding indicator. Since two-types of control channels are provided, the sounding indicator can be represented in one bit. A 1-bit sounding indicator may have a value corresponding to 'ON' or 'OFF', wherein 'ON' indicates the use of an asymmetric control channel and 'OFF' indicates the use of a symmetric control channel. This means that, if the sounding indicator indicates 'ON', the UE can simultaneously transmit uplink control information on the asymmetric control channel and the SRS on a sounding SC-FDMA symbol.

Figure 17:
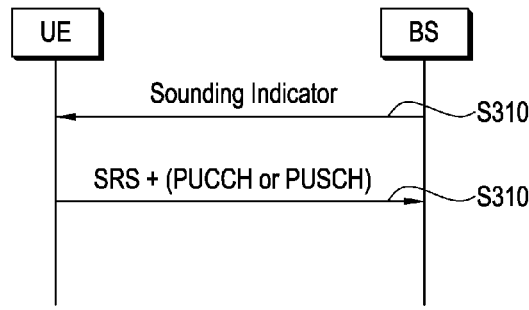
FIG. 17 is a flow diagram of a method of transmitting a signal reference signal by using a sounding indicator.

FIG. 17 is a flow diagram of a method of transmitting an SRS by using a sounding indicator. In step S310, a BS transmits the sounding indicator to a UE. In step S320, the UE can perform the following operations according to indications of the sounding indicator.

When the sounding indicator indicates 'ON', the UE operates as follows. (1) To transmit uplink control information (e.g., an ACK/NACK signal), the UE transmits the uplink control information through a PUCCH (i.e., an asymmetric control channel) in which a sounding SC-FDMA symbol is punctured, and simultaneously, transmits the SRS through the sounding SC-FDMA symbol. (2) If uplink data exists, the UE transmits the uplink data and/or a control signal through the PUSCH. However, the UE does not transmit the uplink data or the control signal on an SC-FDMA symbol through which the SRS is transmitted in one subframe. A band through which the SRS is transmitted in practice may be narrower than a predetermined band. Therefore, if there is a remaining resource after the SRS is transmitted, this may be informed so that the remaining resource can be used in data transmission.

When the sounding indicator indicates 'OFF', the UE operates as follows. (1) To transmit uplink control information, the UE transmits the uplink control information through a general PUCCH (i.e., a symmetric control channel). (2) If uplink data exists, the UE transmits the uplink data and/or control information through a PUSCH.

Figure 18:
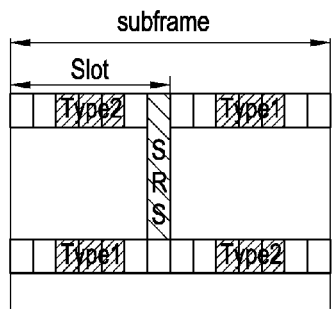
FIG. 18 shows an example of coexistence between a type-1 control channel and a type-2 control channel in one subframe.

FIG. 18 shows an example of coexistence between a type-1 control channel and a type-2 control channel in one subframe. A sounding SC-FDMA symbol is punctured in the type-2 control channel. Thus, an SRS can be transmitted on the sounding SC-FDMA symbol through a PUSCH and a PUCCH. The SRS is not transmitted on the type-1 control channel.

Figure 19:
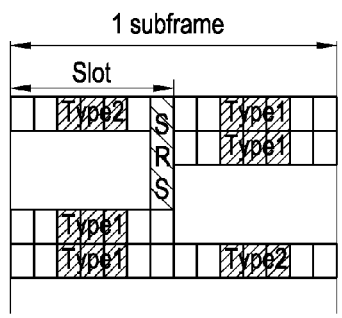
FIG. 19 shows another example of coexistence between a type-1 control channel and a type-2 control channel in one subframe.

FIG. 19 shows another example of coexistence between a type-1 control channel and a type-2 control channel in one subframe. As the type-1 control channel is added, a region is reduced in which an SRS is transmitted on a sounding SC-FDMA symbol.

SECOND EMBODIMENT

Scheduling Performed by BS

A BS performs scheduling so that UEs do not simultaneously transmit uplink control information and an SRS.

Figure 20:
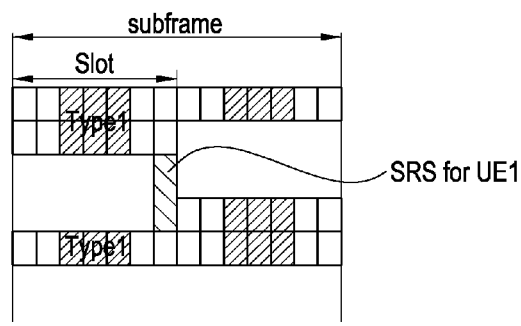
FIG. 20 shows an example of a scheduling method performed by a BS.

FIG. 20 shows an example of a scheduling method performed by a BS. If a UE1 intends to transmit an SRS in a specific subframe, the BS prevents the UE1 from transmitting an ACK/NACK signal on a PUCCH in the subframe. Instead, the BS schedules so that another UE other than the UE1 transmits the ACK/NACK signal in the subframe. That is, the BS schedules so that one UE cannot simultaneously transmit the SRS in one subframe and uplink control information on a PUCCH. This can be achieved by using additional signaling or by transmitting a predetermined SRS.

On the contrary, if there is no need to limit the downlink transmission for the UE1, the BS can prevent the SRS from being transmitted in the subframe.

THIRD EMBODIMENT

Operation of Single-Type PUCCH

A PUCCH in use can be designed so that uplink control information and an SRS are not transmitted through the same resource region. The PUCCH has the same structure irrespective of whether the SRS is transmitted or not. That is, irrespective of whether the SRS is transmitted or not, the PUCCH has a structure in which the SRS is transmitted through only a specific resource region and the control signal is transmitted through only the remaining resource regions other than the specific resource region under the assumption that the specific resource region (e.g., SC-FDMA symbol(s)) designated only for SRS transmission is always used when the SRS is transmitted.

For this, the aforementioned asymmetric control channel structure can be used as a fixed PUCCH structure. For example, in the ACK/NACK channel, a first slot uses 3 demodulation reference signal symbols and 3 ACK/NACK symbols, and the remaining one symbol is punctured to be dedicated for the SRS. A second slot uses 3 demodulation reference signal symbols and 4 ACK/NACK symbols.

FOURTH EMBODIMENT

UEs can be grouped into a plurality of groups, and an SRS can be transmitted based on the groups. A group of UEs that transmit the SRS does not transmit a control signal in a corresponding subframe.

Figure 21:
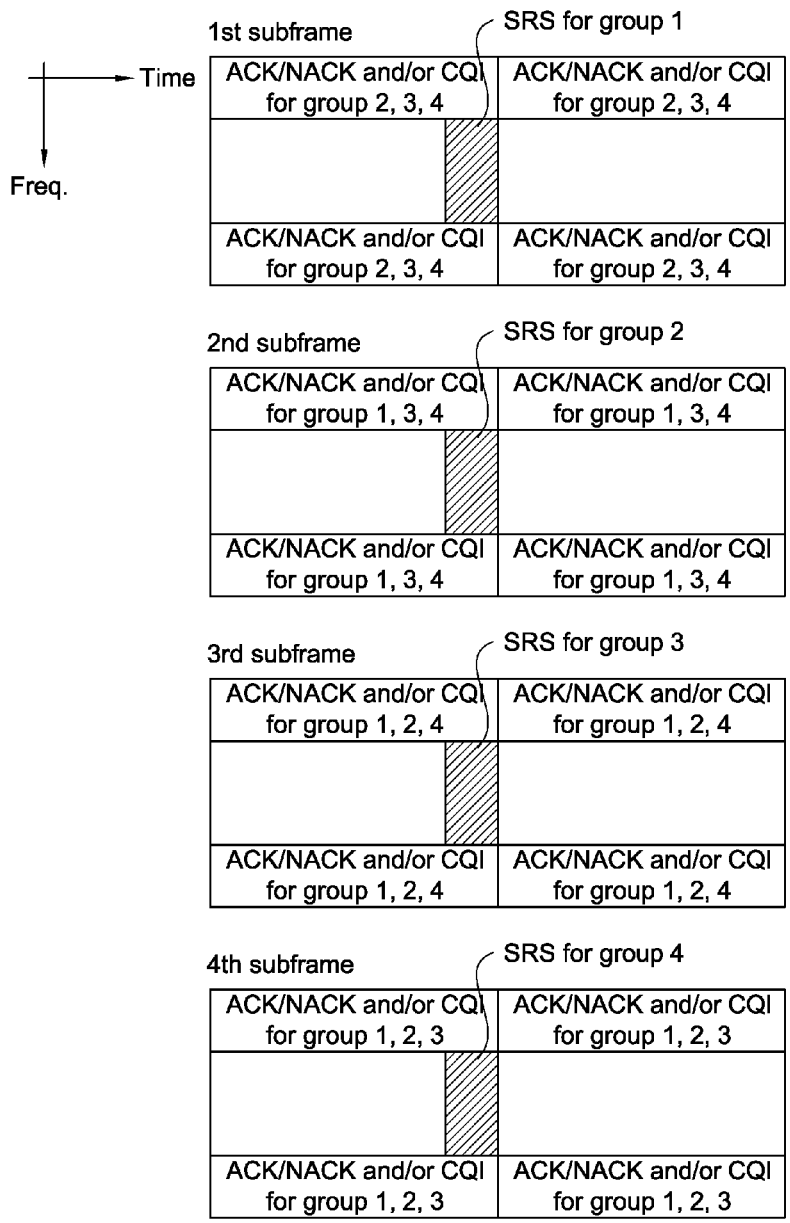
FIG. 21 shows an example of transmission of a signal reference signal with respect to 4 UE groups.

FIG. 21 shows an example of transmission of an SRS with respect to 4 UE groups. Herein, UEs are grouped into 4 groups (i.e., a first group, a second group, a third group, and a fourth group). The number of UEs included in each group may be at least one. The 4 groups are for exemplary purposes only, and thus the present invention is not limited thereto.

In FIG. 21, it is assumed that at least one UE belonging to the group 1 transmits an SRS in a first subframe. In the first subframe, a control channel is not assigned to the UE belonging to the group 1 and is assigned to UEs belonging to the remaining groups 2, 3, and 4. The SRS is transmitted by using only a resource region except for the control channel. The present embodiment conforms to a rule in which a control signal and the SRS are not multiplexed in the same resource region.

Likewise, in a second subframe, a UE belonging to the group 2 transmits the SRS, and the control channel is assigned to UEs belonging to the groups 1, 3, and 4. In a third subframe, a UE belonging to the group 3 transmits the SRS, and the control channel is assigned to UEs belonging to the groups 1, 2, and 4. In a fourth subframe, a UE belonging to the group 4 transmits the SRS, and the control channel is assigned to UEs belonging to the groups 1, 2, and 3.

In this manner, 4 subframes are transmitted, and thus the SRS can be transmitted for all groups.

FIG. 22 shows an example of transmission of an SRS with respect to 9 UE groups. In comparison with the embodiment of FIG. 21, more groups (i.e., groups 1 to 9) are provided, and more resource blocks (or simply referred to as RBs) are assigned to a control region.

Referring to FIG. 22, if an SRS of a group 1 is transmitted in a first subframe, UEs belonging to the remaining groups 2 to 9 other than the group 1 can transmit control information on a control channel while the SRS is transmitted. The SRS of the group 1 and the control channel of the remaining groups use mutually exclusive resource regions instead of simultaneously using the same resource region. The resource regions allocated to the control channel for the groups 2 to 9 are shown for exemplary purposes only, and thus the present invention is not limited to this arrangement.

If an SRS of the group 2 is transmitted in the second subframe, UEs belonging to the remaining groups other than the group 2 can transmit the control information on the control channel while the SRS is transmitted. Unlike in the first subframe, it can be seen that the number of RBs allocated to the control region decreases at both sides and also an index of an allocated group varies in the control region.

Figures 23, 24:
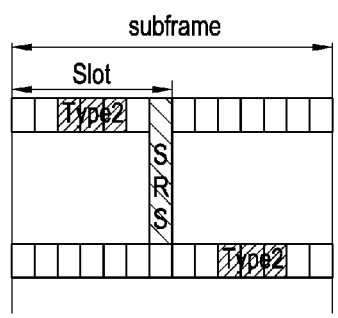
FIG. 23 shows another example of transmission of a signal reference signal with respect to 9 UE groups.
FIG. 24 shows an example of transmission of a signal reference signal.

FIG. 23 shows another example of transmission of an SRS with respect to 9 UE groups.

Referring to FIG. 23, if an SRS of a group 1 is transmitted in a first subframe, UEs belonging to the remaining groups 2 to 9 other than the group 1 can transmit control information on a control channel while the SRS is transmitted. In comparison with the embodiment of FIG. 21 in a first slot and a second slot, the control channels for the remaining groups are symmetrically arranged in a frequency domain.

Scheduling can be performed in every subframe. Thus, the number of RBs allocated to the control region in every subframe, an index of a group that transmits a control signal, a location of a symbol or a group of symbols for transmitting the SRS, and a resource region range can be occasionally changed.

Basically, in the aforementioned method, a configuration can be modified in a subframe unit, and there is a need to support this characteristic. If the number of RBs allocated to the control region changes, the resource region allocated to the SRS associated therewith may also change. The increase in the number of RBs allocated to the control region may result in the decrease in the size of the resource region allocated to the SRS. When the resource region allocated to the SRS decreases, a multiplexing scheme used between UEs and applied to the SRS of each UE may also change. That is, the multiplexing scheme and a hopping scheme need to be modified between the SRSs. This information may be delivered through downlink signaling. In addition, this information may be obtained by using information regarding uplink control channel allocation.

Now, various examples of multiplexing of an SRS and uplink control information and transmission of the multiplexed signal will be described.

FIG. 24 shows an example of transmission of an SRS. The control information is transmitted on a type-2 control channel, and simultaneously, the SRS is transmitted on a punctured sounding SC-FDMA symbol. In this case, the SRS can be transmitted not only on a PUCCH but also a PUSCH.

Figure 25:
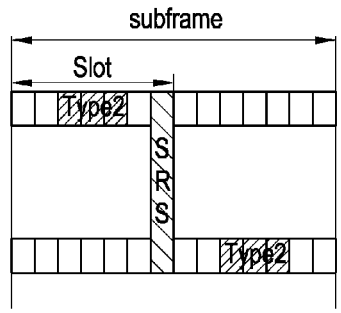
FIG. 25 shows another example of transmission of a signal reference signal.

FIG. 25 shows another example of transmission of an SRS. A type-2 control channel is used, and the SRS is transmitted throughout the entire band on a sounding SC-FDMA symbol.

Figure 26:
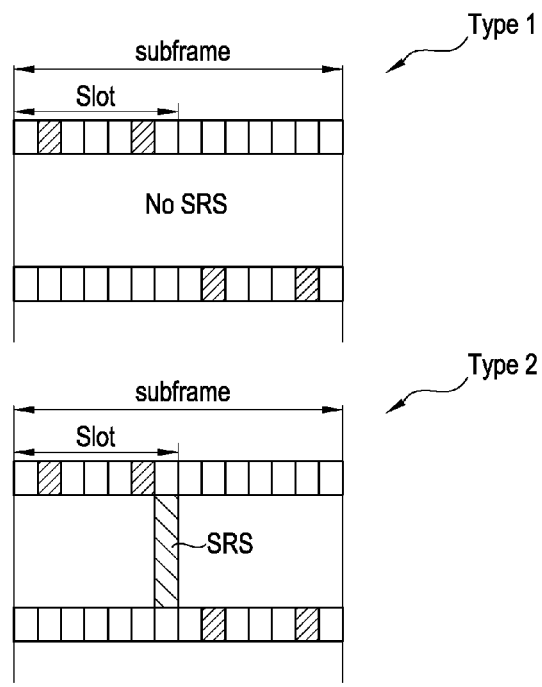
FIG. 26 shows a type-1 control channel and a type-2 control channel when using a CQI channel.

FIG. 26 shows a type-1 control channel and a type-2 control channel when using a CQI channel. The type-1 control channel is a general PUCCH that is used by a CQI when the SRS does not need to be transmitted. During a subframe in which the type-1 channel is used, other UEs cannot transmit the SRS throughout the entire bandwidth. The type-2 control channel is an optional PUCCH provided in consideration of the transmission of the SRS. If the SC-FDMA symbol punctured for the transmission of the SRS is arranged in a first slot, the number of SC-FDMA symbols used for CQI transmission is 4 in the first slot and 5 in a second slot.

Figure 27:
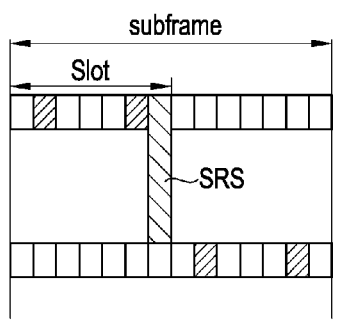
FIG. 27 shows an example of simultaneous transmission of a CQI and a signal reference signal.

FIG. 27 shows an example of simultaneous transmission of a CQI and an SRS. A sounding SC-FDMA symbol is punctured in a type-2 control channel. Thus, the SRS can be transmitted on the sounding SC-FDMA symbol through a PUSCH and a PUCCH. The SRS is not transmitted through a region except for the type-2 control channel. Only a UE that transmits the SRS uses the type-2 control channel. Other UEs can transmit the CQI on a type-1 control channel.

Figure 28:
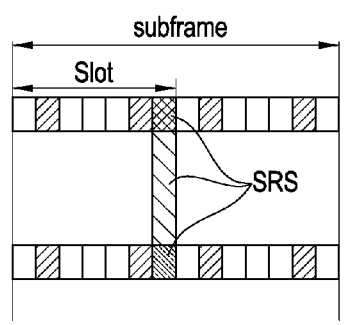
FIG. 28 shows another example of simultaneous transmission of a CQI and a signal reference signal.

FIG. 28 shows another example of simultaneous transmission of a CQI and an SRS. A sounding SC-FDMA symbol is punctured in a type-2 control channel. Thus, the SRS can be transmitted on the sounding SC-FDMA symbol through a PUSCH. Only a UE that transmits the SRS uses the type-2 control channel. Other UEs can transmit CQI on a type-1 control channel.

If the CQI and the SRS are simultaneously transmitted, the type-1 control channel and the type-2 control channel can always coexist in one subframe. This provides convenience in terms of scheduling performed by a BS.

Unlike ACK/NACK, the CQI requires that the SC-FDMA symbol is punctured only for a user which simultaneously transmits the SRS and the CQI. Another user which shares the same puncture location can transmit the CQI in a typical format without having to puncture and without affecting orthogonality. Therefore, system operations can be further facilitated in comparison with the case where the ACK/NACK and the SRS are simultaneously transmitted.

The steps of a method described in connection with the embodiments disclosed herein may be implemented by hardware, software or a combination thereof. The hardware may be implemented by an application specific integrated circuit (ASIC) that is designed to perform the above function, a digital signal processing (DSP), a programmable logic device (PLD), a field programmable gate array (FPGA), a processor, a controller, a microprocessor, the other electronic unit, or a combination thereof. A module for performing the above function may implement the software. The software may be stored in a memory unit and executed by a processor. The memory unit or the processor may employ a variety of means that is well known to those skilled in the art.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims. Therefore, all changes and modifications that fall within the metes and bounds of the claims, or equivalence of such metes and bounds are intended to be embraced by the appended claims.

The invention claimed is:

1. A method for transmitting a reference signal in a wireless communication system, the method comprising:

receiving, by a user equipment, a message including a sounding indicator from a base station, the sounding indicator indicating whether the user equipment is configured to support a transmission of an uplink control signal and a sounding reference signal in one subframe; and determining, by the user equipment, periodically a subframe in which the sounding reference signal is allowed to be transmitted to the base station, the subframe comprising two slots, each of the two slots comprising a plurality of data single carrier-frequency division multiple access (SC-FDMA) symbols and a plurality of reference signal (RS) SC-FDMA symbols;

transmitting, by the user equipment, the uplink control signal and the sounding reference signal in the determined subframe to the base station if the user equipment is configured to support the transmission of the uplink control signal and the sounding reference signal, wherein transmitting the uplink control signal and the sounding reference signal in the determined subframe comprises:

mapping the uplink control signal to the plurality of data SC-FDMA symbols of each of the two slots;

mapping a demodulation reference signal for demodulating the uplink control signal to the plurality of RS SC-FDMA symbols of each of the two slots;

puncturing only one SC-FDMA symbol of the plurality of data SC-FDMA symbols of one of the two slots;

mapping the sounding reference signal to the punctured SC-FDMA symbol; and transmitting the uplink control signal, the demodulation reference signal and the sounding reference signal in the determined subframe via the SC-FDMA symbols to which the uplink control signal, the demodulation reference signal and the sounding reference signal are mapped, wherein the uplink control signal mapped to the plurality of data SC-FDMA symbols of the one of the two slots is spread by a first orthogonal sequence, wherein the uplink control signal mapped to the plurality of data SC-FDMA symbols of the other of the two slots is spread by a second orthogonal sequence having a length different from a length of the first orthogonal sequence, and wherein the uplink control signal mapped to the plurality of data SC-FDMA symbols of the one of the two slots is spread by a spreading factor of 3, and wherein the uplink control signal mapped to the plurality of data SC-FDMA symbols of the other of the two slots is spread by a spreading factor of 4.

2. The method of claim 1, wherein the one of the two slots is allocated on a frequency different from a frequency on which the other of the two slots is allocated.

3. The method of claim 1, wherein the length of the first orthogonal sequence is shorter than the length of the second orthogonal sequence.

4. The method of claim 1, wherein the last SC-FDMA symbol in the subframe is punctured for transmitting the sounding reference signal.

5. The method of claim 1, wherein the uplink control signal is a channel quality information (CQI) or an acknowledgment (ACK)/non-acknowledgment (NACK) signal used in a hybrid automatic repeat request (HARQ) scheme.

6. The method of claim 1, further comprising: transmitting, by the user equipment, the uplink control signal in the determined subframe to the base station if the user equipment is not configured to support the transmission of the uplink control signal and the sounding reference signal.

7. A user equipment configured for transmitting a reference signal in a wireless communication system, the user equipment comprising:
a processor; and
a memory operatively coupled with the processor and storing instructions that when executed by the processor cause the user equipment to:
receive a message including a sounding indicator from a base station, the sounding indicator indicating whether the user equipment is configured to support a transmission of an uplink control signal and a sounding reference signal in one subframe;
determine periodically a subframe in which the sounding reference signal is allowed to be transmitted to the base station, the subframe comprising two slots, each of the two slots comprising a plurality of data single carrier-frequency division multiple access (SC-FDMA) symbols and a plurality of reference signal (RS) SC-FDMA symbols; and
transmit the uplink control signal and the sounding reference signal in a subframe if the user equipment is configured to support the transmission of the uplink control signal and the sounding reference signal,
wherein the memory stores further instructions that when executed by the processor cause the user equipment to transmit the uplink control signal and the sounding reference signal in the determined subframe by:
mapping the uplink control signal to the plurality of data SC-FDMA symbols of each of the two slots;
mapping a demodulation reference signal for demodulating the uplink control signal to the plurality of RS SC-FDMA symbols of each of the two slots;
puncturing only one SC-FDMA symbol of the plurality of data SC-FDMA symbols of one of the two slots;
mapping the sounding reference signal to the punctured SC-FDMA symbol; and
transmitting the uplink control signal, the demodulation reference signal and the sounding reference signal in the determined subframe via the SC-FDMA symbols to which the uplink control signal, the demodulation reference signal and the sounding reference signal are mapped,
wherein the uplink control signal mapped to the plurality of data SC-FDMA symbols of the one of the two slots is spread by a first orthogonal sequence,
wherein the uplink control signal mapped to the plurality of data SC-FDMA symbols of the other of the two slots is spread by a second orthogonal sequence having a length different from a length of the first orthogonal sequence, and
wherein the uplink control signal mapped to the plurality of data SC-FDMA symbols of the one of the two slots is spread by a spreading factor of 3, and wherein the uplink control signal mapped to the plurality of data SC-FDMA symbols of the other of the two slots is spread by a spreading factor of 4.

8. The user equipment of claim 7, wherein the last SC-FDMA symbol in the subframe is punctured for transmitting the sounding reference signal.

9. The user equipment of claim 7, wherein the uplink control signal is a channel quality information (CQI) or an acknowledgment (ACK)/non-acknowledgment (NACK) signal used in a hybrid automatic repeat request (HARQ) scheme.

10. The user equipment of claim 7, wherein the memory stores further instructions that when executed by the processor cause the user equipment to transmit the uplink control signal in the determined subframe to the base station if the user equipment is not configured to support the transmission of the uplink control signal and the sounding reference signal.

* * * * *